United States Patent
Cheng et al.

(10) Patent No.: US 8,230,206 B2
(45) Date of Patent: Jul. 24, 2012

(54) BIOS PARAMETER ERASING METHOD AND APPARATUS APPLIED TO COMPUTER SYSTEM

(75) Inventors: Hsu-Hung Cheng, Taipei (TW); Pei-Hua Sun, Taipei (TW); Chung-Ta Chin, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 339 days.

(21) Appl. No.: 12/560,568

(22) Filed: Sep. 16, 2009

(65) Prior Publication Data

US 2010/0082956 A1   Apr. 1, 2010

(30) Foreign Application Priority Data

Sep. 26, 2008   (TW) ............... 97137244 A

(51) Int. Cl.
*G06F 9/00* (2006.01)
*G06F 15/177* (2006.01)
(52) U.S. Cl. ............................... 713/1; 713/2
(58) Field of Classification Search .............. 713/2, 1
See application file for complete search history.

(56) References Cited

U.S. PATENT DOCUMENTS

| 5,845,136 | A | 12/1998 | Babcock | |
|---|---|---|---|---|
| 6,253,319 | B1 * | 6/2001 | Tran et al. | 713/1 |
| 2009/0144535 | A1 * | 6/2009 | Lin et al. | 713/2 |

FOREIGN PATENT DOCUMENTS

| CN | 1624624 A | 6/2005 |
|---|---|---|
| CN | 2735426 Y | 10/2005 |

OTHER PUBLICATIONS

"Third Office Action of China Counterpart Application", issued on Aug. 1, 2011, p. 1-p. 6.

* cited by examiner

*Primary Examiner* — Thomas Lee
*Assistant Examiner* — Terrell Johnson
(74) *Attorney, Agent, or Firm* — Jianq Chyun IP Office

(57) ABSTRACT

A computer system includes a triggering device; and a motherboard, connected to the triggering device, further comprising: a memory stored with a setting parameter of a basic-input-output-system; and a counter connected between the triggering device and the memory; wherein an erasing signal, for erasing the memory, is outputted to the memory from the counter according to a triggering signal outputted from the triggering device while a boosting procedure cannot be successfully executed by the computer system.

17 Claims, 3 Drawing Sheets

BIOS PARAMETER ERASING METHOD AND APPARATUS APPLIED TO COMPUTER SYSTEM

FIELD OF THE INVENTION

The present invention relates to a computer system with BIOS parameter stored in CMOS (Complementary Metal Oxide Semiconductor), and more particularly to a BIOS parameter erasing method and apparatus applied to the computer system.

BACKGROUND OF THE INVENTION

The main function of BIOS (Basic Input Output System) is to initialize the hardware of a computer system while a user power on the computer system. That is, the boosting procedure is first executed by the computer system based on a plurality of parameters of the BIOS while the user pushing the power button of the computer system. Basically, the BIOS parameters are stored in a CMOS (Complementary Metal Oxide Semiconductor) that is arranged on a motherboard of the computer system, where CMOS is a RAM (Random-Access Memory) and requires less power than other types of memories.

After the power button of the computer system is pushed, a POST (Power-On-Self-Test) program is executed. The user can set the BIOS parameters during the process of executing the POST. That is, a BIOS-SETUP interface is brought after the user pressing some specific functional keys, such as "Del" or "Alt+Ctrl+Esc" while the POST is executing, and the user can set the BIOS parameters via the BIOS-SETUP interface. The BIOS parameters, stored in the CMOS RAM, are some essential date or information about the computer system, such as the types and specifications of IDE, the operation frequency of CPU, or the type and capacity of the memory. Because these BIOS parameters are so important, the computer system cannot be successfully boosted without these BIOS parameters. To guarantee all these BIOS parameters will not be lost after a shutdown of the computer system, the CMOS RAM stored with the BIOS parameters must be powered by a RTC (Real-Time Clock) battery, where the RTC battery is also arranged on the motherboard but is independent of the power source of the other parts in the computer system. In other words, the RTC battery can always provide power to the CMOS RAM even the computer system is shutdown, so as the BIOS parameters stored in the CMOS RAM can be always kept.

As described above, the BIOS parameters can be set by the user via the BIOS-SETUP interface. Once the BIOS parameters are set again, the computer system will start to process the boosting procedures based on the updated BIOS parameters after the user pushing the power button of the computer system next time. However, the user may set wrong parameters. Once the user sets wrong some important BIOS parameters, such as the operation frequency of CPU, a boost failure of the computer system or a startup failure of the monitor may be happened.

Once the startup failure of monitor is occurred, the user has no way to correct the BIOS parameters, because the monitor cannot display messages on the screen. However, the user still can restore the initial BIOS parameters back to the computer system via erasing the CMOS RAM, and then the computer system will start to process the boosting procedures based on the initial BIOS parameters after the user pushing the power button of the computer system next time.

FIG. 1 is a block diagram of a conventional motherboard of a computer system. The motherboard 10 comprises a CPU (Central Processing Unit) 101, a north bridge 103, a south bridge 105, a CMOS RAM 107, a RTC battery 109, and a pin set 111, where the BIOS parameters are stored in the CMOS RAM 107; the CMOS RAM 107 is powered by the RTC battery 109; and the pin set 111 includes three pins (#1, #2, #3).

The initial BIOS parameters can be restored back to the computer system via changing connection of the three pins (#1, #2, #3) 111. Firstly, the user must enforce to shutdown the computer system. Because the computer system cannot enter to the operation system (OS) due to the failure of the execution of BIOS, user can enforcedly shutdown the computer system via continuously pressing the power button of the computer system over four seconds (4-second shutdown) or directly plugging out the power line of the computer system. After the shutdown of the computer system, the user then changes connection of the jumper to pins (#2, #3) from pins (#1, #2). Several seconds later, the user again changes the connection of the jumper back to pins (#1, #2) from pins (#2, #3). The object of shortly moving the jumper to pins (#2, #3) is to make a short circuit between the pins (#2, #3), and once the pins (#2, #3) are short circuit, a CMOS-erasing signal (RTCRST#) is pulled down to a low level and is transmitted to CMOS RAM 107 from the south bridge 105. After the CMOS-erasing signal (RTCRST#) with a low level is transmitted to the CMOS RAM 107, the CMOS RAM 107 is erased, so as the initial parameters (data, time, system parameters) are restored back to computer system. Then, the user can press the power button of the computer system; accordingly the computer system will start to process the boosting procedures based on the initial BIOS parameters.

Or, the initial BIOS parameters can be restored back to the computer system via temporarily removing the RTC battery 109 from the motherboard 10. Firstly, the user can enforcedly shutdown the computer system via continuously pressing the power button of the computer system over four seconds (4-second shutdown) or directly plugging out the power line of the computer system. Afterwards, the user removes the RTC battery 109 from the motherboard 10 for several seconds, and then attaches the RTC battery 109 back to motherboard 10 again. Because the CMOS RAM 107 is directly powered by the RTC battery 109, the CMOS RAM 107 will be erased while the RTC battery 109 is temporarily removed from the motherboard 10 for several seconds, so as the initial BIOS parameters are restored back to the computer system. Then, the user can press the power button of the computer system; accordingly the computer system will start to process the boosting procedures based on the initial BIOS parameters.

However, no matter restoring the initial BIOS parameters back to the computer system via the pin set 111 or via temporarily removing the RTC battery 109 from motherboard 10, the user must dismantle and reassemble the case of the computer system and thus is inconvenient.

SUMMARY OF THE INVENTION

Therefore, the object invention is to provide BIOS parameter erasing method and apparatus for user to conveniently erase BIOS parameter.

The present invention provides a computer system including a triggering device; and a motherboard, connected to the triggering device, further comprising: a memory stored with a setting parameter of a basic-input-output-system; and a counter connected between the triggering device and the memory; wherein an erasing signal, for erasing the memory, is outputted to the memory from the counter according to a triggering signal outputted from the triggering device while a boosting procedure cannot be successfully executed by the computer system.

Furthermore, the present invention provides a BIOS parameter erasing method of a computer system including a triggering device and a counter, comprising steps of: activating the triggering device to generate a triggering signal while parameters stored in a memory of the BIOS is failed to process a boosting procedure; and outputting an erasing signal, for erasing the memory, to the memory from the counter based on the triggering signal.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

An erasing of CMOS RAM can be done without dismantling and reassembling the case of the computer system according to the present invention. When a user presses the power button arranged on the case of the computer system several times (say, four times), a signal for erasing the CMOS RAM is then automatically generated. Because the power button is arranged on the case of the computer system, the erasing of the CMOS RAM can be done without the work of dismantling and reassembling the case of the computer system.

Figure 1:
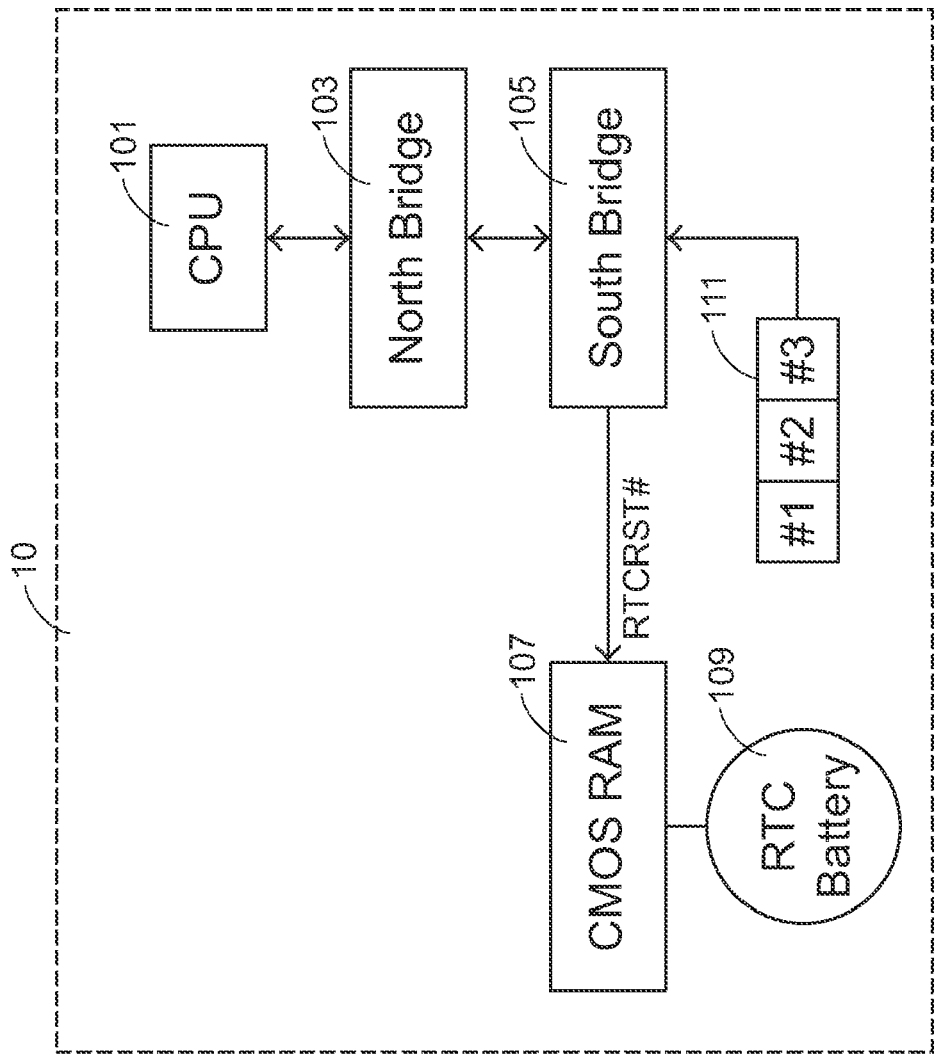
FIG. 1 is a block diagram illustrating a conventional motherboard of a computer system.
Figure 2:
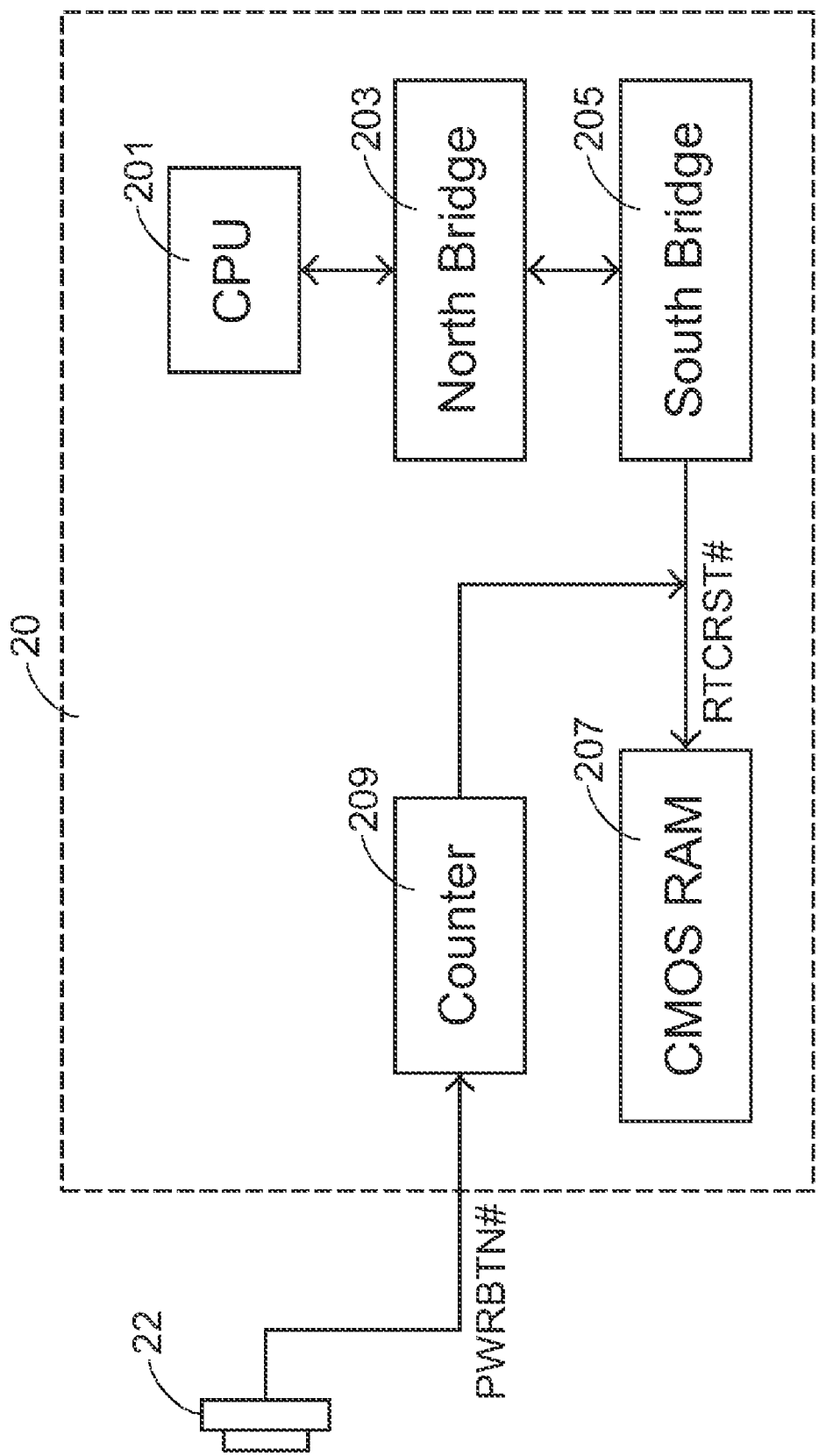
FIG. 2 is a block diagram illustrating the computer system of the present invention capable of erasing the CMOS RAM via multi pressing the power button.

FIG. 2 is a block diagram illustrating the computer system of the present invention capable of erasing the CMOS RAM via pressing the power button several times. The computer system of the present invention mainly comprises a motherboard 20 and a power button 22, where the power button 22 is arranged on a case (not shown) of the computer system. The motherboard 20 further comprises a CPU 201, a north bridge 203, a south bridge 205, a CMOS RAM 207, and a counter 209 connected to the power button 22, the CMOS RAM 207, and the south bridge 205.

As mentioned above, the boosting procedures is executed by the computer system of the present invention based on the parameters of BIOS stored on the CMOS RAM 207 after the user pressing the power button 22.

Once a boost failure of the computer system is occurred as a result of a wrong setting of the BIOS parameters and then the CMOS RAM is accordingly needed to be erased, the user can continuously press the power button 22 several times (e.g., 4 times). In the embodiment, a power-button-press signal (PWRBTN#) is outputted from the power button 22 followed with each press of the power button 22. There will be four power-button-press signals (PWRBTN#) outputted from the power button 22 after the user continuously pressing the power button 22 four times. In the embodiment, a converting signal for converting the level of the CMOS-erasing signal (RTCRST#) is outputted from the counter 209 once four power-button-press signals (PWRBTN#) are detected by the counter 209, so as the CMOS RAM 207 is erased. In other words, the CMOS-erasing signal (RTCRST#) is pulled down to a low level by the converting signal which is outputted from the counter 209 as a result of four power-button-press signals (PWRBTN#) are detected.

It is to be understood that the duration of the each press of the power button 22 must be controlled to less than four seconds when the user plans to erase the CMOS RAM 207 via continuously pressing the power button 22 four times, so as the computer system will not be shutdown enforcedly.

Figures 3A, 3B:
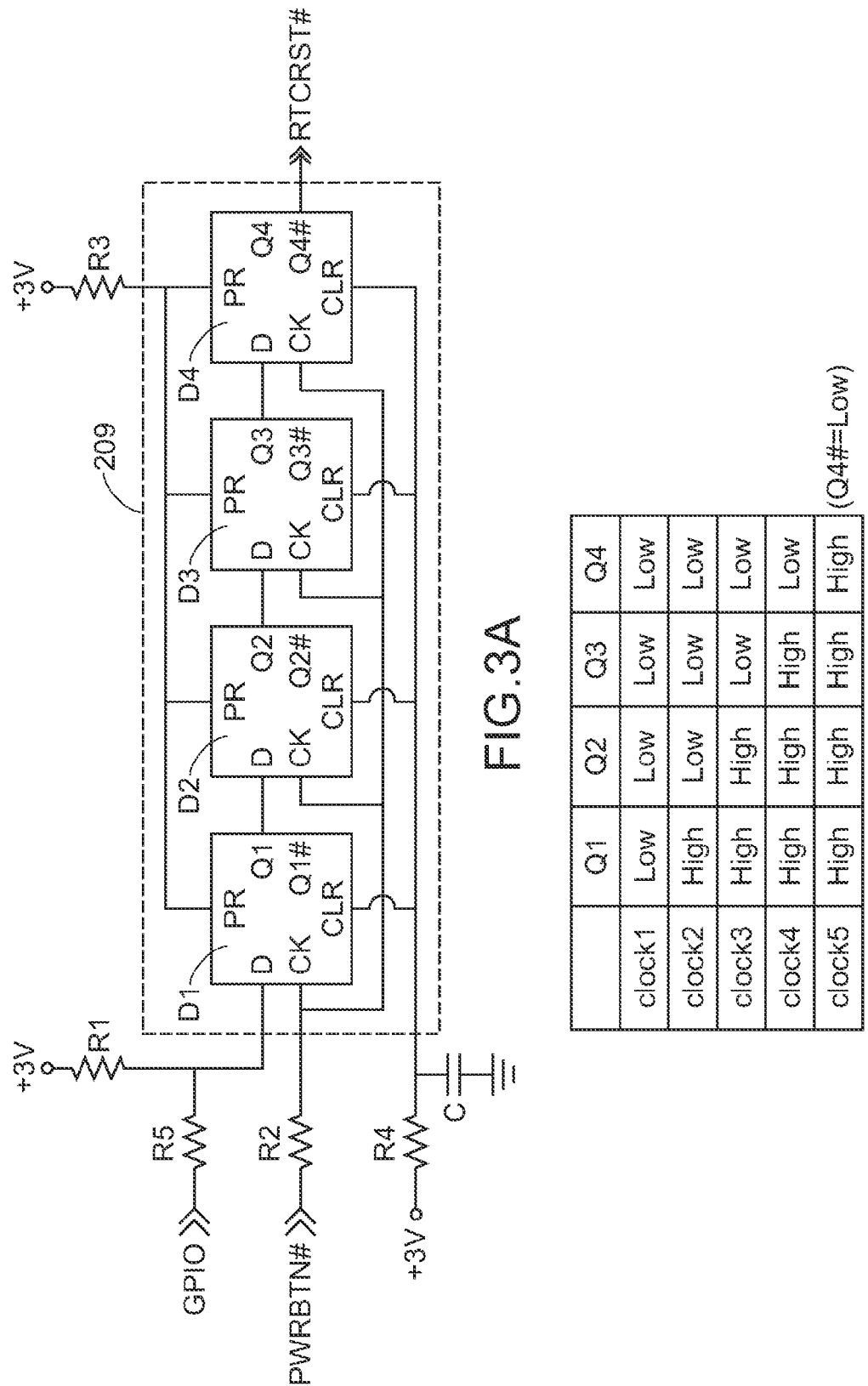
FIG. 3A is a circuit diagram illustrating the counter adopted in the present invention.
FIG. 3B is a true table derived from the four D-Type Flip Flops arranged in the counter depicted in FIG. 3A.

FIG. 3A is a circuit diagram illustrating the counter adopted in the present invention, where the counter can be implemented by four D-Type Flip Flops coupled in series in the embodiment. FIG. 3B is a true table derived from the four D-Type Flip Flops arranged in the counter depicted in FIG. 3A. The counter 209 comprises a first-stage D-Type Flip Flop (D1), a second-stage D-Type Flip Flop (D2), a third-stage D-Type Flip Flop (D3), and a fourth-stage D-Type Flip Flop (D4). The signal-input terminal (D) of the first-stage D-Type Flip Flop (D1) is connected to a voltage-power source (+3V) via a resistor (R1). The signal-input terminals (D) of the second-stage D-Type Flip Flop (D2), the third-stage D-Type Flip Flop (D3), and the fourth-stage D-Type Flip Flop (D4) are respectively connected to the signal-output terminals (Q1, Q2, and Q3) of the first-stage D-Type Flip Flop (D1), the second-stage D-Type Flip Flop (D2), and the third-stage D-Type Flip Flop (D3). The power-button-press signal (PWRBTN#) which is outputted from the power button 22 (FIG. 2) is transmitted to the clock terminals (CK) of the first-stage D-Type Flip Flop (D1), the second-stage D-Type Flip Flop (D2), the third-stage D-Type Flip Flop (D3), and the fourth-stage D-Type Flip Flop (D4) via a resistor (R2). The preset terminals (PR) of the first-stage D-Type Flip Flop (D1), the second-stage D-Type Flip Flop (D2), the third-stage D-Type Flip Flop (D3), and the fourth-stage D-Type Flip Flop (D4) are connected to the voltage-power source (+3V) via a resistor (R3). The clear terminals (CLR) of the first-stage D-Type Flip Flop (D1), the second-stage D-Type Flip Flop (D2), the third-stage D-Type Flip Flop (D3), and the fourth-stage D-Type Flip Flop (D4) are connected to the voltage-power source (+3V) via a resistor (R4). The clear terminals (CLR) of the first-stage D-Type Flip Flop (D1), the second-stage D-Type Flip Flop (D2), the third-stage D-Type Flip Flop (D3), and the fourth-stage D-Type Flip Flop (D4) are connected to ground (GND) via a capacitor (C). The complementary-signal-output terminal (Q4#) of the fourth-stage D-Type Flip Flop (D4) is connected to the CMOS RAM 207 (FIG. 2) and from which the CMOS-erasing signal (RTCRST#) is outputted. Moreover, a power-button-press signal (PWRBTN#) with a high-low-high level is generated followed with each press of the power button 22 (FIG. 2). In other words, a clock is formed in the power-button-press signal (PWRBTN#) followed with each press of the power button 22.

When the user first time presses the power button 22 (FIG. 2) to boost the computer system, a first clock (Clock1) is formed in the power-button-press signal (PWRBTN#). At the meanwhile of the first-time press of the power button 22, the preset terminals (PR) and the clear terminals (CLR) of the four D-Type Flip Flops (D1, D2, D3, D4) are started to pull up to a high level by the voltage-power source (+3V). In the initial state, the signal-output terminals (Q) of the four D-Type Flip Flops (D1, D2, D3, D4) are at a low level. That is, the signal-output terminals (Q1, Q2, Q3, Q4) of the four D-Type Flip Flops (D1, D2, D3, D4) are at a low level while the user first time pressing the power button 22 to boost the computer system.

When the boost failure of the computer system is occurred as a result of wrong setting of the BIOS, the user must continuously presses the power button 22 (FIG. 2) four times to erase the CMOS RAM 207 (FIG. 2). When the user first time presses the power button 22 after the BIOS is failed to execute by the computer system, a second clock (Clock2) is formed in the power-button-press signal (PWRBTN#). Then, the high-level signal at the signal-input terminal (D) of the first-stage D-Type Flip Flop (D1) originally pulled up by the voltage-power source (+3V) is transmitted to the signal-output terminal (Q1) of the first-stage D-Type Flip Flop (D1) after the user first time pressing the power button 22 while the BIOS is failed to execute by the computer system. To sum up, the logic configuration at the signal-output terminals (Q1, Q2, Q3, Q4) of the four D-Type Flip Flops (D1, D2, D3, D4) is (High, Low, Low, Low) while the user first time pressing the power button 22 after the BIOS is failed to execute by the computer system.

Similarly, when the user second time presses the power button 22 after the BIOS is failed to execute by the computer system, a third clock (Clock3) is formed in the power-button-press signal (PWRBTN#). Then, the high-level signal at the signal-input terminal (D) of the second-stage D-Type Flip Flop (D2) is transmitted to the signal-output terminal (Q2) of the second-stage D-Type Flip Flop (D2). To sum up, the logic configuration at the signal-output terminals (Q1, Q2, Q3, Q4) of the four D-Type Flip Flops (D1, D2, D3, D4) is (High, High, Low, Low) while the user second time pressing the power button 22 after the BIOS is failed to execute by the computer system.

Similarly, when the user third time presses the power button 22 after the BIOS is failed to execute by the computer system, a fourth clock (Clock4) is formed in the power-button-press signal (PWRBTN#). Then, the high-level signal at the signal-input terminal (D) of the third-stage D-Type Flip Flop (D3) is transmitted to the signal-output terminal (Q3) of the third-stage D-Type Flip Flop (D3). To sum up, the logic configuration at the signal-output terminals (Q1, Q2, Q3, Q4) of the four D-Type Flip Flops (D1, D2, D3, D4) is (High, High, High, Low) while the user third time pressing the power button 22 after the BIOS is failed to execute by the computer system.

Similarly, when the user fourth time presses the power button 22 after the BIOS is failed to execute by the computer system, a fifth clock (Clock5) is formed in the power-button-press signal (PWRBTN#). Then, the high-level signal at the signal-input terminal (D) of the fourth-stage D-Type Flip Flop (D4) is transmitted to the signal-output terminal (Q4) of the fourth-stage D-Type Flip Flop (D4). To sum up, the logic configuration at the signal-output terminals (Q1, Q2, Q3, Q4) of the four D-Type Flip Flops (D1, D2, D3, D4) is (High, High, High, High) while the user fourth time pressing the power button 22 after the BIOS is failed to execute by the computer system.

Moreover, to avoid the CMOS RAM 207 is mistakenly erased by the user via continuously pressing the power button 22 four times after the BIOS is already successfully executed by the computer system, a GPIO (general-purpose I/O) signal is further inputted to the signal-input terminal (D) of the first-stage D-Type Flip Flop (D1) via a resistor (R5) in the embodiment, where the signal-output terminal (D) of the first-stage D-Type Flip Flop (D1) is pulled down to a low level by the GPIO signal while the BIOS is successfully executed by the computer system. That is, once the BIOS is successfully executed by the computer system, the complementary-signal-output terminal (Q4#) of the fourth-stage D-Type Flip Flop (D4) is still maintained at a high level even the user continuously pressing the power button 22 four times, so as the erasing of the CMOS RAM 207 will not be executed.

Moreover, it is to be understood that the invention needs not be limited to erase the CMOS RAM via continuously pressing the power button four times. The erasing of the CMOS RAM in the present invention can be achieved via continuously pressing the power button N times, accordingly, the counter adopted in the present invention must be implemented by N numbers of D-Type Flip Flops coupled in series.

Moreover, it is to be understood that the invention needs not be limited to adopt the power button as a triggering device to generate triggering signal. Any device arranged on the case of the computer system, such as the reset button, the finger-print identifying device, a specific key or multi keys on a keyboard, can be adopted as the triggering device for generating trigging signal to the counter.

Moreover, the counter adopted in the present invention can be integrated in the south bridge.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A computer system, comprising:
    a triggering device; and
    a motherboard, connected to the triggering device, further comprising:
        a memory stored with a setting parameter of a basic-input-output-system; and
        a counter connected between the triggering device and the memory,
    wherein an erasing signal, for erasing the memory, is outputted to the memory from the counter according to a triggering signal outputted from the triggering device while a boosting procedure cannot be successfully executed,
    wherein the counter further comprises N numbers of D-Type Flip Flops coupled in series,
    wherein a signal with a first level is outputted to a signal-input terminal of a first-stage D-Type Flip Flop from a voltage-power source, each signal-input terminal of a second-stage to a Nth-stage D-Type Flip Flop is connected to a signal-output terminal of the prior stage D-Type Flip Flop, the triggering signal is transmitted to clock terminals of the N numbers of D-Type Flip Flops from the triggering device, and the erasing signal is outputted from a complementary-signal-output terminal of the Nth-stage D-Type Flip Flop.

2. The computer system according to claim 1 wherein the memory is a CMOS RAM.

3. The computer system according to claim 1 wherein the triggering signal is generated via continuously pressing the triggering device for a predetermined time.

4. The computer system according to claim 3 wherein duration of each press of the triggering device is less than four seconds.

5. The computer system according to claim 1 wherein the erasing of the memory is to restore the initial setting parameter of the basic-input-output-system to the memory.

6. The computer system according to claim 1 wherein the signal-output terminals of the N numbers of D-Type Flip Flops are outputted a second level before the triggering signal is generated by the triggering device.

7. The computer system according to claim 1 wherein preset terminals of the N numbers of D-Type Flip Flops are connected to the voltage-power source via a third resistor; clear terminals of the N numbers of D-Type Flip Flops are connected to the voltage-power source via a fourth resistor; the clear terminals of the N numbers of D-Type Flip Flops are connected to ground via a capacitor.

8. The computer system according to claim 1 wherein a general purpose I/O signal is inputted to the signal-input terminal of the first-stage D-Type Flip Flop via a fifth resistor, and the signal-input terminal of the first-stage D-Type Flip Flop is maintained at the second level by the general purpose I/O signal while the boosting procedure is executed successfully.

9. The computer system according to claim 1 wherein the trigger device is a power button, a preset button, a finger-print identifying device, a key or multi keys on a keyboard.

10. A BIOS parameter erasing method of a computer system including a triggering device and a counter, comprising steps of:
    activating the triggering device to generate a triggering signal while parameters stored in a memory of the BIOS is failed to process a boosting procedure; and
    outputting an erasing signal, for erasing the memory, to the memory from the counter based on the triggering signal, wherein the counter further comprises N numbers of D-Type Flip Flops coupled in series, wherein a signal with a first level is outputted to a signal-input terminal of a first-stage D-Type Flip Flop from a voltage-power source, each signal-input terminal of a second-stage to a Nth-stage D-Type Flip Flop is connected to a signal-output terminal of the prior stage D-Type Flip Flop, the triggering signal is transmitted to clock terminals of the N numbers of D-Type Flip Flops from the triggering device, and the erasing signal is outputted from a complementary-signal-output terminal of the Nth-stage D-Type Flip Flop.

11. The method according to claim 10 wherein the memory is a CMOS RAM.

12. The method according to claim 10 wherein the triggering signal is generated via continuously pressing the triggering device for a predetermined time.

13. The method according to claim 12 wherein duration of each press of the triggering device is less than four seconds.

14. The method according to claim 10 wherein the erasing of the memory is to restore the initial setting parameter of the basic-input-output-system to the memory.

15. The method according to claim 10 wherein the counter is implemented by N numbers of D-Type Flip Flops coupled in series.

16. The method according to claim 10 wherein the erasing signal is not outputted to the memory from the counter while the boosting procedure is successfully executed.

17. The method according to claim 10 wherein the triggering device is a power button, a preset button, a finger-print identifying device, a key or multi keys on a keyboard.

* * * * *